United States Patent [19]

LeVan et al.

[11] 4,161,336

[45] Jul. 17, 1979

[54] DUAL-OPENING SUN ROOF

[75] Inventors: Eugene B. LeVan, Whittier; John Lehne, Hacienda Heights, both of Calif.

[73] Assignee: LeVan Specialty Co. Inc., City of Industry, Calif.

[21] Appl. No.: 871,383

[22] Filed: Jan. 23, 1978

[51] Int. Cl.$^2$ ............................................. B60J 9/08
[52] U.S. Cl. .............................................. 296/137 B
[58] Field of Search ...................... 296/137 B, 137 R; 49/504, 465, 464; 98/2.14

[56] References Cited

U.S. PATENT DOCUMENTS

| 2,556,062 | 6/1951 | Buehrig | 296/137 B |
| 4,095,841 | 6/1978 | Thompson | 296/137 B |

*Primary Examiner*—Robert R. Song
*Attorney, Agent, or Firm*—Francis X. LoJacono

[57] ABSTRACT

A dual-opening. sun-roof unit for automobiles and like vehicles which includes a pair of juxtaposed openings having transparent, movable panels supported on individual, resilient moldings, each opening defined by a peripheral frame structure mounted within an aperture cut in the vehicle roof, the frame including a central, dividing strut member, wherein one transparent panel is located over the driver's side of the vehicle and the other panel is located over the passenger side. The central dividing strut member is formed having a recess compartment whereby various accessories can be supported or arranged therein, including a removable cover plate. Each transparent panel includes a separate latch mechanism arranged at the rear edge of the panel, with hinge members mounted along the forward edge of the window and frame opening — thus, each panel is permitted to pivot to an elevated position separately from the other, as well as being individually removed from the associated opening.

10 Claims, 11 Drawing Figures

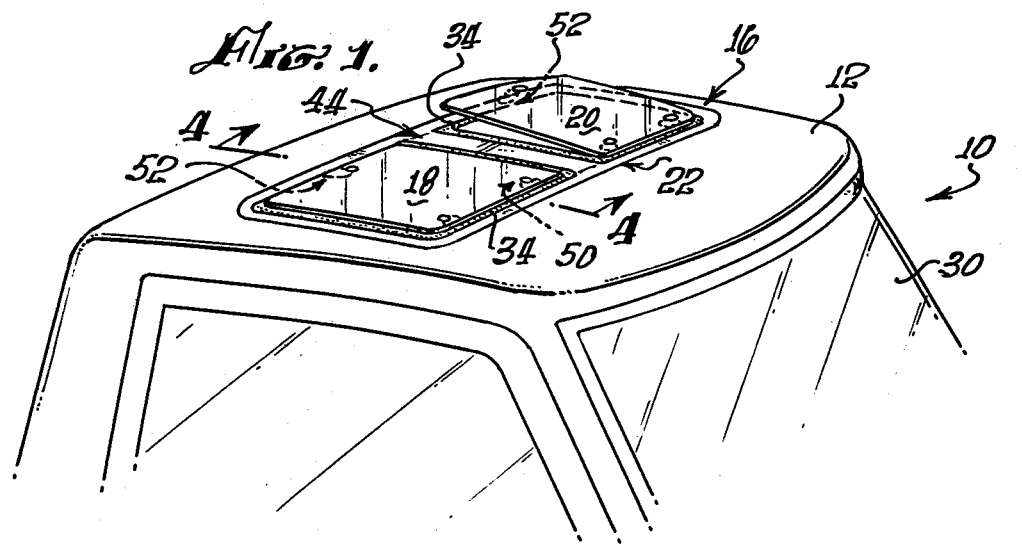
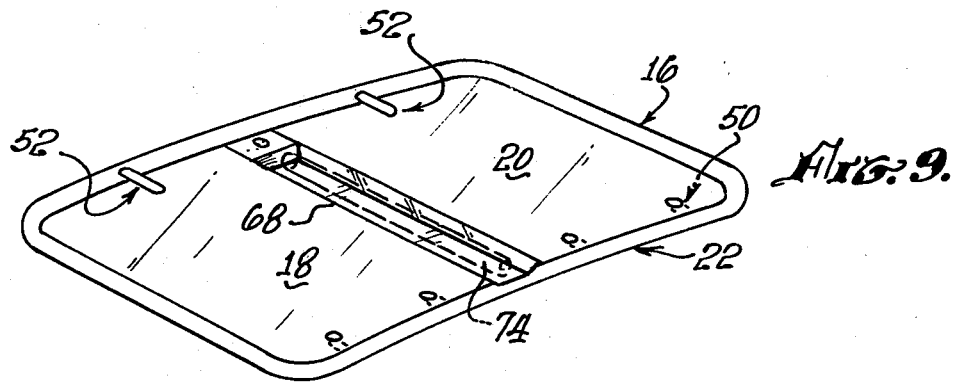
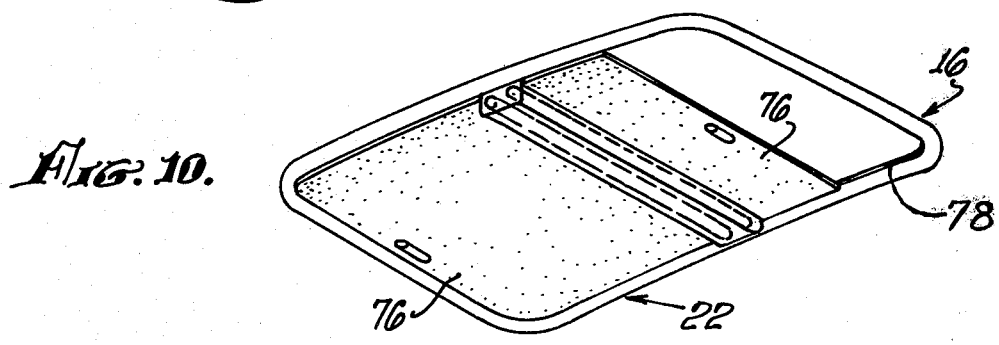
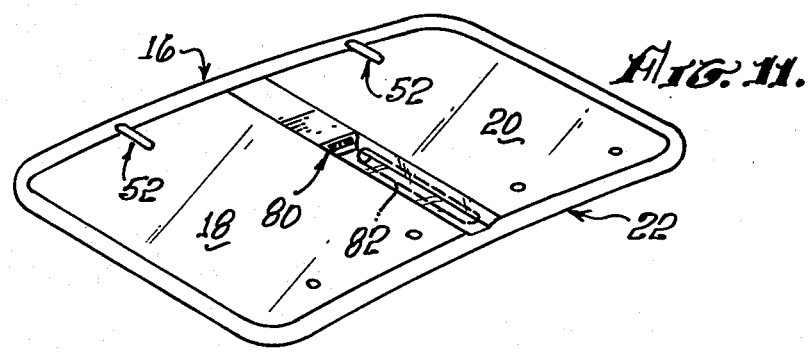

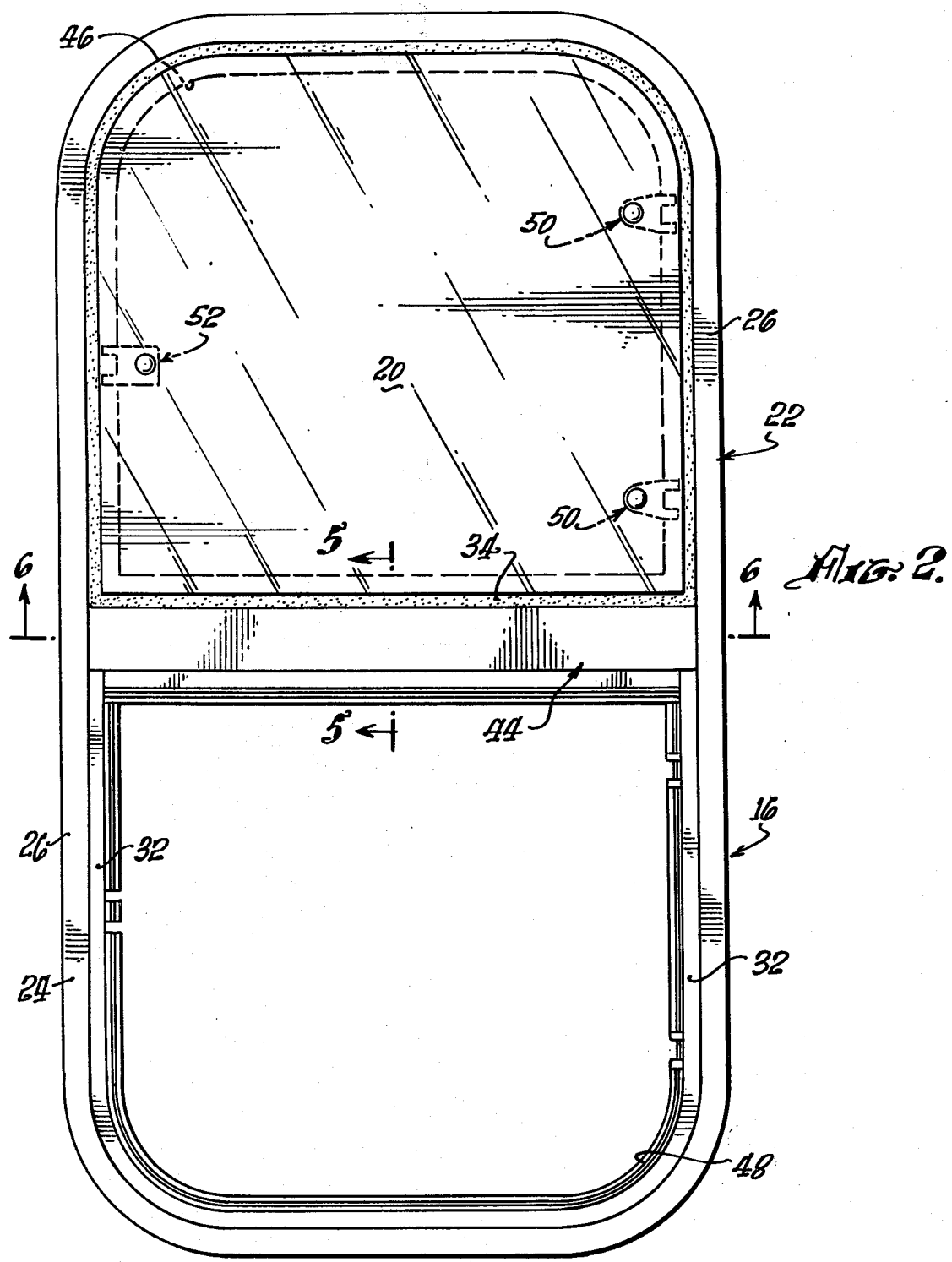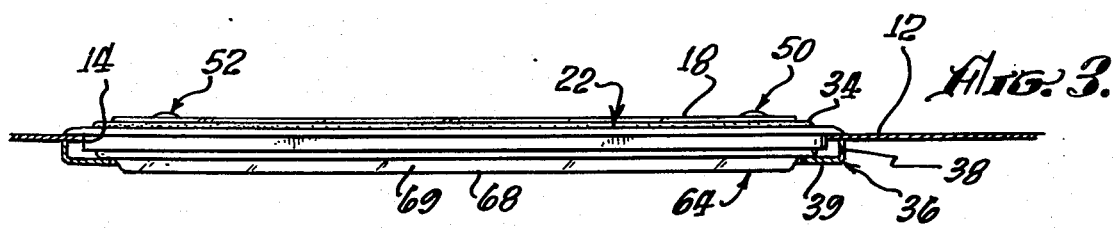

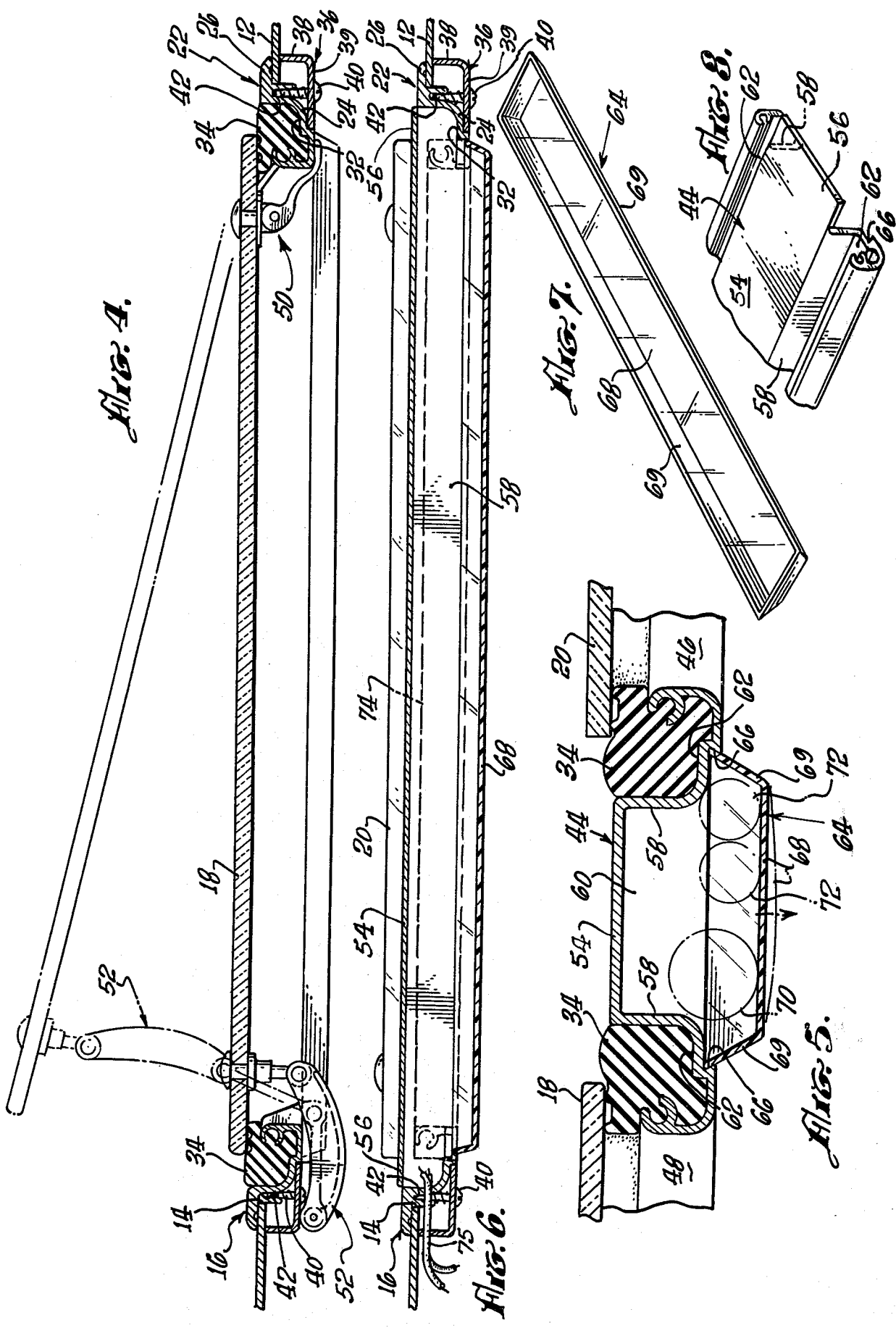

DUAL-OPENING SUN ROOF

BACKGROUND OF THE INVENTION

1. Field of the Invention

This invention relates generally to automobile sun roofs and, more particularly, to a sun roof having a pair of juxtaposed, transparent, movable panels supported in individual openings formed in a singular framework structure.

2. Description of the Prior Art

As is well known in the art, various types of sun roofs, sliding-roof sections and removable, section roof panels have been tried, and some are now in use. Several of the known devices have become successful, such as the units disclosed in U.S. Pat. No. 3,913,971 to Green; U.S. Pat. No. 3,974,753 to Blomgren; and U.S. Pat. No. 3,905,641. As will be noted, some of the above patents relate to sun roofs and the like that provide a single panel that is centrally positioned over the front seats of a vehicle; while other patents relate more specifically to the associated latches and hinges used therewith. Thus, it is evidence from these patents that movable, covered openings, in themselves, are old in the art; and a need for improvement is due in order to meet the market demand which exists at the present time. The industry today is looking for improvements wherein there is provided a better sun roof that is every appealing, easy to operate, and simple to install.

Accordingly, at the present time further improvements are being made in the construction of suitable marketable sun roof units.

Hence, the hereinafter disclosed device provides a novel, dual-panelled sun roof having additional features not found in the art. It should also be kept in mind that the present invention is primarily designed for the aftermarket—that is, a sun roof that is constructed to be installed after the vehicle has been produced and sold.

Referring to dual, but separate, opening covers or panels in a vehicle-roof construction, there is disclosed in U.S. Pat. No. 2,556,062 a vehicle having two separate openings formed in the roof section. These openings are adapted to be closed by readily securable, but removable, panels which form part of the roof structure of the vehicle. With this arrangement, the use of such a dual structure as shown must be constructed at the time the vehicle is produced, and does not lend itself to an aftermarket or a "do-it-yourself" installation. Further, a device of this type and design is provided as a hard-top convertible, and is a substitute for persons wanting the vehicle characteristic of a convertible; and, thus, it is generally limited to a two-door sedan or coupe type of vehicle.

SUMMARY OF THE INVENTION

The present invention comprises a dual-opening sun roof wherein two side-by-side glass panels are movably located in a singular, overall frame structure that is adapted to be mounted in an opening cut in the vehicle's roof over the front seat area. The frame structure includes a central strut member fixed to the peripheral frame so as to divide the singular frame, thereby defining two separate openings. These openings are covered by individual glass panels which are latchable and hinged to the peripheral frame section, whereby the driver's side and the adjacent passenger's side are separately provided with respective operable sun-roof sections.

Hence, the passenger can operate the panel disposed over his side of the vehicle; while the driver can operate the panel over his side.

The central dividing strut also defines a compartment having a removable cover wherein the compartment can be used as a storage area or a compartment to receive various accessories therein.

OBJECTS AND ADVANTAGES OF THE INVENTION

The present invention has for an important object a provision wherein a sun roof is arranged having dual-operating, glass panel members wherein each panel is separately secured to its respective opening defined by a singular, peripheral frame structure combined by a central strut member.

It is another object of the invention to provide a sun roof of this type that also includes a central, elongated compartment that can be adapted for various uses, such as a storage compartment or a compartment to receive various other accessories (i.e., C.B. radios, light fixtures, clocks etc.).

It is still another object of the invention to provide a sun roof that includes two side-by-side operable panels which can be individually removed.

It is a further object of the invention to provide a unit of the type that requires only one central opening formed in the roof of the vehicle.

It is still a further object of the invention to provide a sun roof of this character that is easy to service and to maintain.

Still another object of the present invention is to provide a device of this character that is relatively inexpensive to manufacture, and that is simple and rugged in construction.

The characteristics and advantages of the invention are further sufficiently referred to in connection with the accompanying drawings, which represent one embodiment. After considering this example, skilled persons will understand that variations may be made without departing from the principles disclosed and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a pictorial view of the present invention installed in the roof of a vehicle;

FIG. 2 is an enlarged, top-plan view of the sun roof wherein one of the glass panels is removed;

FIG. 3 is an end-elevational view of the device supported in an opening of a vehicle roof;

FIG. 4 is an enlarged, cross-sectional view taken along line 4—4 of FIG. 1;

FIG. 5 is an enlarged, cross-sectional view taken along line 5—5 of FIG. 2, showing the central strut defining a storage compartment;

FIG. 6 is a cross-sectional view taken along line 6—6 of FIG. 2, showing a lamp fixture in phantom lines mounted in the compartment;

FIG. 7 is a perspective of the removable compartment cover;

FIG. 8 is a fragmentary perspective of one end of the central strut member;

FIGS. 9, 10 and 11 illustrate various accessories that are capable of being positioned or located in the central strut compartment.

DESCRIPTION OF THE PREFERRED EMBODIMENT

Referring more particularly to FIG. 1, there is shown a vehicle, generally indicated at 10, having a roof 12 in which an opening 14 is cut. (See FIG. 3.) The vehicle represents any type of motor vehicle (i.e., cars, trucks, vans) wherein the present invention is readily capable of being installed. The installation, thereof, is generally over the driver's seat and the adjacent passenger's seat.

The present sun roof, designated generally at 16, is shown in FIG. 1 mounted within opening 14 of roof 12, and is further illustrated as having two juxtaposed panels 18 and 20 that are preferably of transparent material, such as glass or a transparent plastic, wherein panel 18 is shown in a closed mode over the passenger side of the vehicle, while panel 20 is located over the driver's side and is shown in an open mode. Further, it should be understood that each glass panel can be individually removed from its respective opening—thereby allowing either the driver or the passenger to remove the panel located above his side.

Referring more specifically to the construction of the sun roof 16, the sun roof comprises a main, peripheral frame structure, generally indicated at 22, having a substantially rectangular, preformed, extruded-aluminum molding 24. Molding 24 is adapted to be inserted into roof aperture or opening 14, wherein a peripheral flange member 26 of molding 24 is supported by roof 12. Thus, frame 22 is supported within the single opening 14 cut in roof 12, wherein opening 14 is generally located over the front seat or seats of the vehicle which define the areas over the driver's side and the adjacent passenger's side. Thus, opening 14 and frame 22 preferably extend laterally over a substantial width of roof 12, and are most preferably dispoed just behind or adjacent the windshield 30.

The particular cross-sectional configuration of the main frame molding is shown in one form, and could be shaped in any suitable manner wherein there is included a channel, such as 32, that is coextensive about the molding so as to accommodate a continuous, resilient rubber gasket 34 which defines a sealing means between the panels 18 and 20, and the frame structure 16.

The main peripheral frame member 22 is secured in opening 14 by a lower clamping ring 36 which comprises a substantilly "L"-shaped, cross-sectional configuration defining an angle frame member. That is, roof 12 is secured between upper flange member 26 of molding 24 and the vertically disposed side wall 38 of clamping ring 36, with wall 38 abutting the underside of roof 12, as seen in FIGS. 4 and 6. Clamping ring 36 includes an inwardly extending bottom wall 39 which engages the main frame structure coextensively about the underside thereof and entirely surrounds the opening in the roof. Frame or molding 24 and clamping ring 36 are further secured together by suitable fastening means, such as self-tapping screws 40 which are received in suitable opening or a continuous slot such as at 42.

Accordingly, the above main frame structure is mounted in a singular opening, wherein the main frame includes a centrally disposed strut member, indicated generally at 44. This strut member is positioned so as to traverse the frame molding 24 from front to rear, and thereby establishes two separate, juxtaposed, left and right panel openings 46 and 48, respectively. Each defined opening includes hinge means 50 of any suitable type, including various releasable hinge devices as shown in FIG. 4. Further included therein is a suitable latching means, designated generally at 52.

As is well understood in the art, the hinge means 50 are positioned along the leading or front side of the frame structure, and the latching means are located at the area or back side of the frame structure. This allows the panels 18 and 20 to be opening while the vehicle is in motion.

Strut member 44 comprises a substantially flat, elongated wall 54 that extends across from the front to the rear sides of the main frame member, and includes projecting, securing lip members 56 disposed at each end thereof (see FIG. 8). Each lip is secured to its respective portion of the main frame, as seen in FIG. 6. However, various suitable securing means can be provided, depending upon the particular cross-sectional configuration of the frame molding. Strut member 44 further includes elongated side wall members 58 which thereby define a compartment 60.

In order to provide a complete sealing means for each independent panel opening 46 and 48, central strut 44 further includes oppositely disposed, recessed channels 62 integrally formed as part of the side walls 58. This is clearly shown in FIGS. 5 and 8. Thus, channels 62 are suitably formed to receive the resilient sealing means 34 therein, wherein—as seen in the top-plan view of FIG. 2—the rubber or resilient seal 34 is disposed in a continuous arrangement about each panel opening 46 and 48, whereby each respective panel 20 and 18 is completely sealed when in a closed mode.

An attaching means is also provided in the strut member whereby various covers, trays, panels or like elements, such as 64, can be attached thereto. In FIG. 5, the cross-sectional view illustrates strut member 44 as having a longitudinal, engaging shoulder 66 disposed in the oppositely disposed side walls 58. Each shoulder 66 is formed along the bottom longitudinal portion of channels 62 wherein cover 64 can be snapped therein. As seen in FIG. 5, cover 64 comprises a box-like cover having a bottom wall 68—which can be of any configuration such as flat or bowed, shown in dotted lines—and integrally formed upright wall 69.

Walls 69 are shown positioned angularly wherein the free edges thereof are received in the longitudinal shoulders, generally formed from a flexible plastic material. If used as indicated in the example shown in FIG. 5, compartment 60 together with cover 64 defines a storage compartment wherein various elements can be stored for ready use. As an example, a flashlight 70 and flares 72 can be stored therein.

Other examples of the various uses for the central compartment are seen in FIGS. 6, 9, 10 and 11.

In FIGS. 6 and 9, the cover 68 is illustrated as being translucent in order to allow light to pass therethrough. That is, compartment 60 can be adapted to receive and have mounted therein a light fixture 74, with wires 75 extending from one end thereof in order to be connected to the electric system of the vehicle.

In FIG. 10, the compartment 60 is shown having oppositely disposed shade members mounted therein. If clear glass or plastic is used for panel members 18 and 20, the shade members 76 can be arranged to slide in an out of compartment 60; and, if necessary, tracks 78 can be mounted to the side members of the main frame structure.

As a further example of various elements that can be adapted for use therewith, FIG. 11 illustrates the mounting of a digital clock 80 in conjunction with a lamp 82. Thus, it can be seen that numerous uses can be found for such a structure having a central compartment.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

We claim:

1. A dual-opening, sun roof mounting in an aperture formed in an automobile roof wherein the improvement of said sun roof comprises:
   a main, peripheral frame structure having a substantially rectangular configuration including front, rear and side portions;
   a central strut member secured between said front and rear portions of said frame structure;
   a compartment defined by said central strut member;
   a pair of framed openings defined by said main frame and said central strut member;
   a sealing means supported within the perimeter of each framed opening;
   a pair of panel members hingedly mounted in respective openings;
   means for latching said panels along said rear portion of said frame structure; and
   means for releasably hinging said panels along said front portion of said frame structure, whereby each of said panels is individually operated.

2. A dual-opening, sun roof as recited in claim 1, wherein one of said openings and its associated panel is positioned substantially over the passenger side of said automobile.

3. A dual-opening, sun roof as recited in claim 3, wherein there is included a cover arranged to be attached to said strut member in order to enclose said compartment.

4. A dual-opening, sun roof as recited in claim 3, wherein said main frame structure comprises an extruded-aluminum molding having a continuous channel formed therein to carry said sealing means therein for engagement with said panels.

5. A dual-opening, sun roof as recited in claim 4, wherein said central-strut member comprises:
   a substantially flat, elongated wall that extends across from said front to said rear frame portion and is secured thereto; and oppositely disposed, depending, sidewall members, each wall member having upturned channel members formed thereon to correspond to said channel of said molding.

6. A dual-opening, sun roof as recited in claim 5, wherein each oppositely disposed, side-wall member includes means for releasably attaching said cover to said strut member.

7. A dual-opening, sun roof as recited in claim 6, wherein said cover comprises an elongated, cover wall having upturned side-wall members of a translucent material.

8. A dual-opening, sun roof as recited in claim 7, wherein a lamp fixture is mounted within said compartment.

9. A dual-opening, sun roof as recited in claim 6, wherein said cover includes a clock fixture therein.

10. A dual-opening, sun roof as recited in claim 5, wherein said pair of oppositely disposed shade members is mounted within said compartment.

* * * * *